United States Patent
Thampy et al.

(10) Patent No.: US 10,897,401 B2
(45) Date of Patent: Jan. 19, 2021

(54) DETERMINING THE IMPORTANCE OF NETWORK DEVICES BASED ON DISCOVERED TOPOLOGY, MANAGED ENDPOINTS, AND ACTIVITY

(71) Applicant: Cisco Technology, Inc., San Jose, CA (US)

(72) Inventors: Sajjit Thampy, San Jose, CA (US); Zachariah Cherian, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 16/280,686

(22) Filed: Feb. 20, 2019

(65) Prior Publication Data
US 2020/0267054 A1 Aug. 20, 2020

(51) Int. Cl.
*H04L 12/24* (2006.01)

(52) U.S. Cl.
CPC ................... *H04L 41/12* (2013.01)

(58) Field of Classification Search
CPC ....................................................... H04L 41/12
See application file for complete search history.

(56) References Cited

U.S. PATENT DOCUMENTS

| | | | |
|---|---|---|---|
| 5,819,028 A | 10/1998 | Manghirmalani et al. | |
| 8,543,681 B2 | 9/2013 | Bearden et al. | |
| 2002/0130907 A1* | 9/2002 | Chi | G06F 16/954 |
| | | | 715/853 |
| 2008/0243813 A1* | 10/2008 | Liu | G06F 16/951 |
| 2010/0121792 A1* | 5/2010 | Yang | G06F 16/9024 |
| | | | 706/12 |
| 2017/0310588 A1* | 10/2017 | Zuo | H04L 45/34 |
| 2018/0278477 A1* | 9/2018 | Auvenshine | H04L 41/12 |
| 2019/0180185 A1* | 6/2019 | Sun | G06N 3/084 |
| 2019/0342145 A1* | 11/2019 | Chen | H04L 41/0631 |

FOREIGN PATENT DOCUMENTS

CN 104835103 B 4/2018

OTHER PUBLICATIONS

Morteza Mardani et al.; "Dynamic Anomalography: Tracking Network Anomalies via Sparsity and Low Rank", arxiv.org; Sep. 11, 2018, pp. 1-26 (33 pgs.).

Gourov, Vassil Nikolaev; "Network Monitoring with Software Defined Networking"; Semantic Scholar, Aug. 30, 2013; pp. 1-33; (75 pgs.).

* cited by examiner

*Primary Examiner* — Andrew Lai
*Assistant Examiner* — Harry H Kim
(74) *Attorney, Agent, or Firm* — Merchant & Gould P.C.

(57) ABSTRACT

Determining the importance of network devices based on a discovered topology, managed endpoints, and activity may be provided. First, topology data may be received corresponding to a network comprising a plurality of devices. Then, a topology matrix may be created representing the topology data. Next, a stationary matrix may be determined from the topology matrix. The stationary matrix may indicate a relative importance of each of the plurality of devices within the network. A health score may then be determined for at least one of the plurality of devices based on the relative importance of the at least one of the plurality of devices. The health score may be determined using the stationary matrix.

17 Claims, 5 Drawing Sheets

|   | A | B | C | D | E | F | G | H | I | J | K |
|---|---|---|---|---|---|---|---|---|---|---|---|
| A | 0 | 0.3 | 0.3 | 0.33 | 0 | 0 | 0 | 0 | 0 | 0 | 0 |
| B | 0.2 | 0 | 0 | 0 | 0.2 | 0.2 | 0.2 | 0 | 0.2 | 0 | 0 |
| C | 0.3 | 0 | 0 | 0 | 0 | 0 | 0.25 | 0.3 | 0.25 | 0 | 0 |
| D | 0.3 | 0 | 0 | 0 | 0 | 0 | 0 | 0 | 0.25 | 0 | 0 |
| E | 0.1 | 0.1 | 0.1 | 0.13 | 0.13 | 0.13 | 0.13 | 0.1 | 0.13 | 0.3 | 0.25 |
| F | 0.1 | 0.1 | 0.1 | 0.13 | 0.13 | 0.13 | 0.13 | 0.1 | 0.13 | 0.1 | 0.13 |
| G | 0 | 0.5 | 0.5 | 0 | 0 | 0 | 0 | 0 | 0 | 0.1 | 0.13 |
| H | 0.1 | 0.1 | 0.1 | 0.13 | 0.13 | 0.13 | 0.13 | 0.1 | 0.13 | 0 | 0 |
| I | 0 | 0.3 | 0.3 | 0.33 | 0.13 | 0.13 | 0.13 | 0.1 | 0.13 | 0.1 | 0.13 |
| J | 0.1 | 0.1 | 0.1 | 0.13 | 0.13 | 0.13 | 0.13 | 0.1 | 0.13 | 0 | 0 |
| K | 0.1 | 0.1 | 0.1 | 0.13 | 0.13 | 0.13 | 0.13 | 0.1 | 0.13 | 0.1 | 0.13 |

DETERMINING THE IMPORTANCE OF NETWORK DEVICES BASED ON DISCOVERED TOPOLOGY, MANAGED ENDPOINTS, AND ACTIVITY

TECHNICAL FIELD

The present disclosure relates generally to network monitoring.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings:

FIG. 3 is a flow chart of a method for determining the importance of network devices based on a discovered topology, managed endpoints, and activity;

DETAILED DESCRIPTION

Overview

Figure 1:
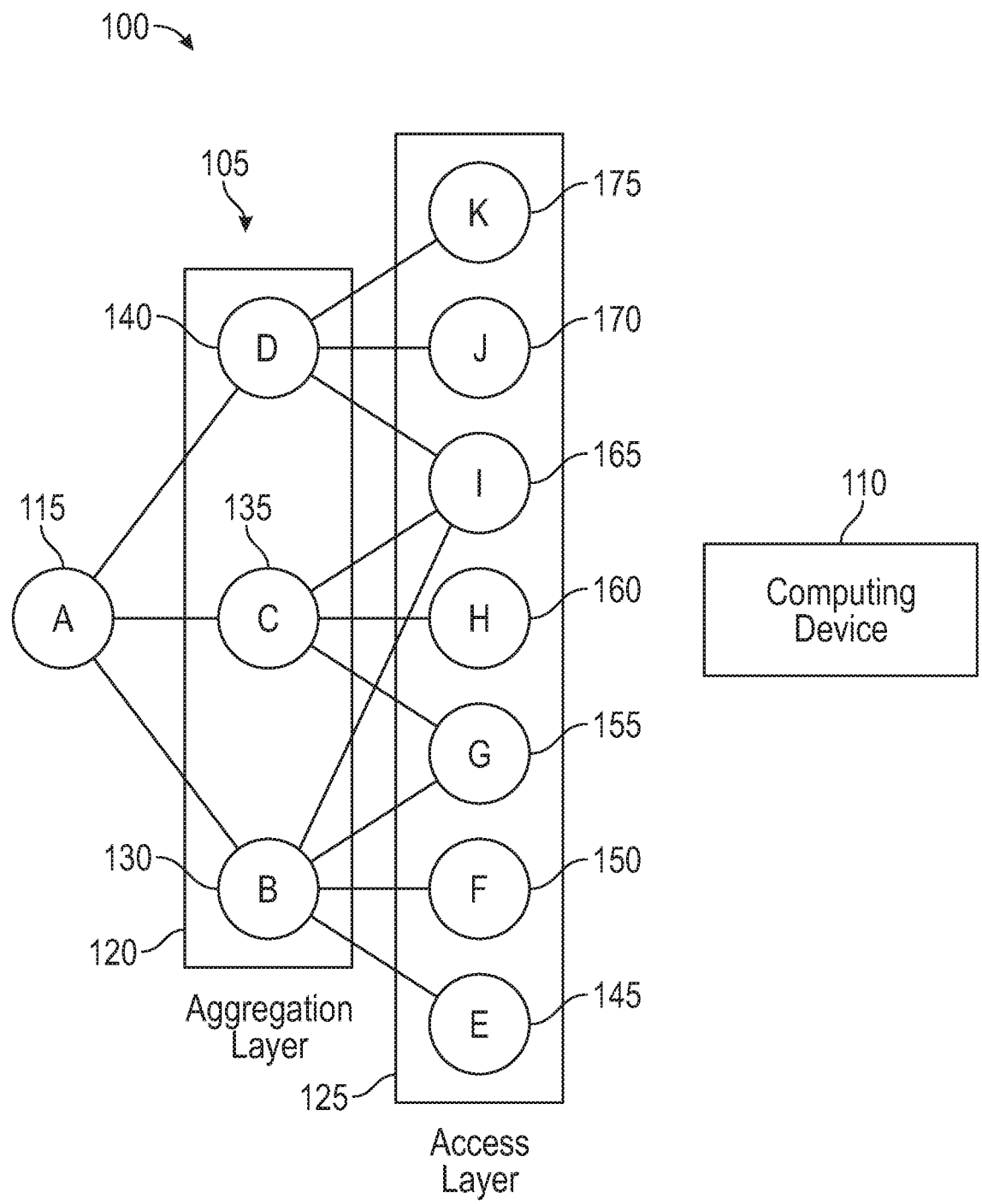
FIG. 1 is a block diagram of an operating environment.

Determining the importance of network devices based on a discovered topology, managed endpoints, and activity may be provided. First, topology data may be received corresponding to a network comprising a plurality of devices. Then, a topology matrix may be created representing the topology data. Next, a stationary matrix may be determined from the topology matrix. The stationary matrix may indicate a relative importance of each of the plurality of devices within the network. A health score may then be determined for at least one of the plurality of devices based on the relative importance of the at least one of the plurality of devices. The health score may be determined using the stationary matrix.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In commercial deployments of networks it is often the case that certain switches tend to be critical by virtue of how the network is deployed. For example, an entire building may be dependent on a few of devices (e.g., switches, links, or nodes) to function in order to stay connected. While network operators may have an "off-the-cuff" knowledge about these critical devices, it may not be immediately evident to an alerting system which devices are important unless a network operator tags them as such.

Embodiments of the disclosure may provide a process to automatically determine an importance of a network device based on the network connection topology with zero interference. The determined importance may then be used to determine a health score of a monitored network. In this way, intent based monitoring and reporting of a network may be provided without requiring prescriptive inputs to guide operator notifications and reporting network status.

FIG. 1 is a block diagram of an operating environment 100 for determining the importance of network devices based on a discovered topology, managed endpoints, and activity. As shown in FIG. 1, operating environment 100 may comprise a network 105 and a computing device 110. Network 105 may comprise a plurality of devices comprising, but not limited to, routers, switches, links, nodes, or Access Points (APs). For example, network 105 may include a first device 115 (i.e., device A), a first portion of the plurality of devices disposed in an aggregation layer 120 of network 105, and a second portion of the plurality of devices disposed in an access layer 125 of network 105. The first portion of the plurality of devices may comprise a second device 130 (i.e., device B), a third device 135 (i.e., device C), and a fourth device 140 (i.e., device D). The second portion of the plurality of devices may comprise a fifth device 145 (i.e., device E), a sixth device 150 (i.e., device F), a seventh device 155 (i.e., device G), an eighth device 160 (i.e., device H), a ninth device 165 (i.e., device I), a tenth device 170 (i.e., device J), and an eleventh device 175 (i.e., device K).

Elements of operating environment 100 (e.g., the plurality of devices and computing device 110) may be practiced in hardware and/or in software (including firmware, resident software, micro-code, etc.) or in any other circuits or systems. The elements of operating environment 100 (e.g., the plurality of devices and computing device 110) may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 (e.g., the plurality of devices and computing device 110) may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 (e.g., the plurality of devices and computing device 110) may be practiced in a computing device 500.

Embodiments of the disclosure may provide a process to determine an overall health score for devices in the network and for the network as a whole. Embodiments of the disclosure may also provide a network operator with a process to obtain the most important degradation and failure alerts happening on the network. The process may be vendor agnostic and may rely on the network topology. For example, a process consistent with embodiments of the disclosure may first read (i.e., discover) the network's devices and network topology. Next the process may determine a 2D matrix representing the connections (i.e., links) indicated by the discovered topology. As described in greater detail below, the 2D matrix may be used to determine which devices in the network may be more important than other devices in the network.

Figure 2:
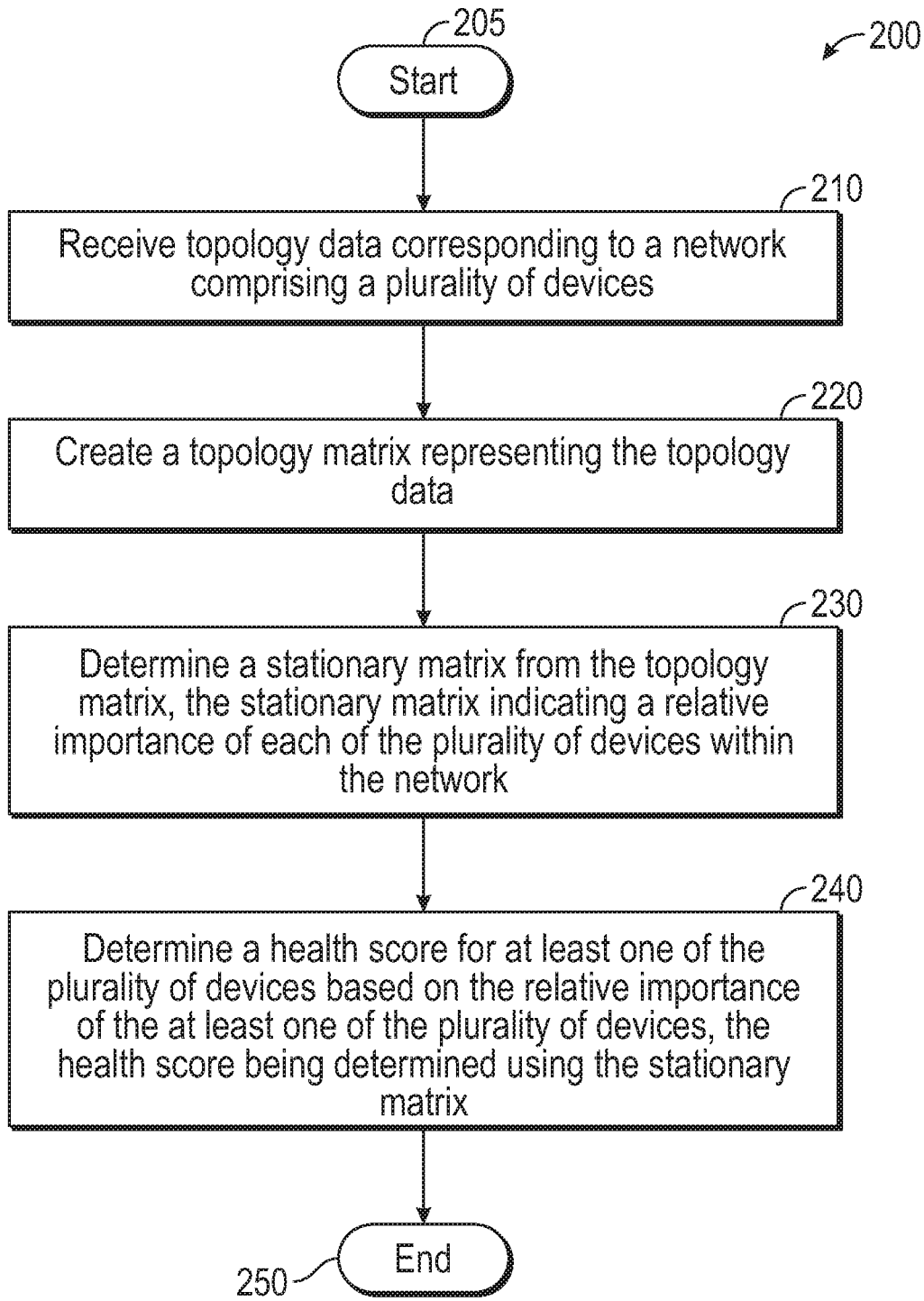
FIG. 2 is a matrix representing the topology of a network.

FIG. 2 is a flow chart setting forth the general stages involved in a method 200 consistent with an embodiment of the disclosure for determining the importance of network devices based on discovered topology, managed endpoints, and activity. Method 200 may be implemented using a computing device 110 as described above with respect to FIG. 1, which may be implemented using a computing device 500 as described in more detail below with respect to FIG. 5. Ways to implement the stages of method 200 will be described in greater detail below.

Method 200 may begin at starting block 205 and proceed to stage 210 where computing device 110 may receive topology data corresponding to network 105 comprising the plurality of devices. For example, computing device 110 may receive the topology data corresponding to network 105 as shown in FIG. 1. The topology data may include, but is not limited to, a name (e.g., a label) for the plurality of devices in network 105, a layer (e.g., aggregation layer 120 or access layer 125) in which the plurality devices may be disposed, and the presences of links (i.e., connection state) between the plurality of devices.

From stage 210, where computing device 110 receives the topology data corresponding to network 105 comprising the plurality of devices, method 200 may advance to stage 220 where computing device 110 may create a topology matrix representing the received topology data. Topology matrix may comprise a sparse matrix and may be stochastic, primitive, and irreducible. The topology matrix for network 105, for example, may comprise matrix 300 shown in FIG. 3 where the rows and columns correspond to the plurality of devices of network 105.

One process for creating the topology matrix for network 105 may be for rows that are completely empty, fill in values of 0.125 (i.e., ⅛ or any similar small number) in those cells of the topology matrix. For rows that have entries, empty cells may be left as zeros. The entry, for example, for cell (row=A, col=B) may be 0.33 (i.e., ⅓). This is because device A has 3 links, one of which leads to device B. Also it may not matter which way the data flows, only that B has 1 of 3 nodes that A is connected to. Likewise, other cells may be provided in a similar way. For example, (row=B, col=E) may be 0.25 (i.e., ¼) because E is one of 4 devices B is connected to. Notwithstanding, the elements shown in matrix 300 of FIG. 3 may comprise decimal approximations.

Once computing device 110 creates the topology matrix representing the topology data in stage 220, method 200 may continue to stage 230 where computing device 110 may determine a stationary matrix from the topology matrix. The stationary matrix may indicate a relative importance of each of the plurality of devices within network 105. For example, the stationary matrix may be represented as (I) and the topology matrix may be represented by (X). The stationary matrix may be obtained by multiplying an 11×1 randomly initialized matrix (I) with (X). This multiplication may be an iterative process and should be done a set number of times until the output shows little change. It may be represented as:

$$I(k+1)=XI(k)$$

The output of the above process where matrix 300 shown in FIG. 3 is used for (X) may yield the following values for I:
I=[0.1139, 0.1421, 0.1421, 0.1013, 0.0589, 0.0589, 0.0911, 0.06534, 0.1139, 0.0561, 0.0561]; corresponding to Nodes [A . . . K].
When sorted from greatest to least, this yields a relative importance order as follows:
[B], [C], [A, I], [D], [G], [H], [J, K].
The process has correctly rated devices A, B, C as highly important. It has also rated device I as an important device given that it is connected to three aggregation layer 120 devices.

After computing device 110 determines the stationary matrix from the topology matrix in stage 230, method 200 may proceed to stage 240 where computing device 110 may determine a health score for at least one of the plurality of devices based on the relative importance of the at least one of the plurality of devices. The health score may be determined using the stationary matrix. For example, to determine the health score, several attributes that are readable may be used in conjunction with the relative importance provided by the stationary matrix. The attributes may comprise, but are not limited to, bandwidth capacity of a device, manually labelled (if available) position of a device in network 105, presence or absence of redundant links at the device, and the number of known users at the device. Whatever process use to blend the above existing attributes into the health score, the above described relative importance may be included in the process. Accordingly, this allows the most important failures to surface further up the sort order of issues discovered by computing device 110.

The relative importance and relevance of a device may be used to yield a weighting (e.g., 1-10 or 1-100) for the device and associated links. For example, relative importance may be classified as Low, Medium, or High with proportional weights assigned to them. The number of end user endpoints on network 105 that may be affected by loss of a network device, network functions leveraged on the device, and presence of redundant paths around the device, may also be factors in determining a network device's relative importance weight.

Other use cases may include where a device's importance may be used in computing the health score. These attributes may comprise, but are not limited to, link status, presence of link errors, and congestion at a link level. Once computing device 110 determines the health score for the at least one of the plurality of devices in stage 240, method 200 may then end at stage 250.

The above referenced process may only be run once to determine device relative importance. If need be, however, it may be run every time computing device 110 detects new devices on network 105 or when devices are removed from network 105 or replaced. Automatic determination of importance may deliver true intent based monitoring and assurance without requiring prescriptive inputs from the network operator.

Figure 4:
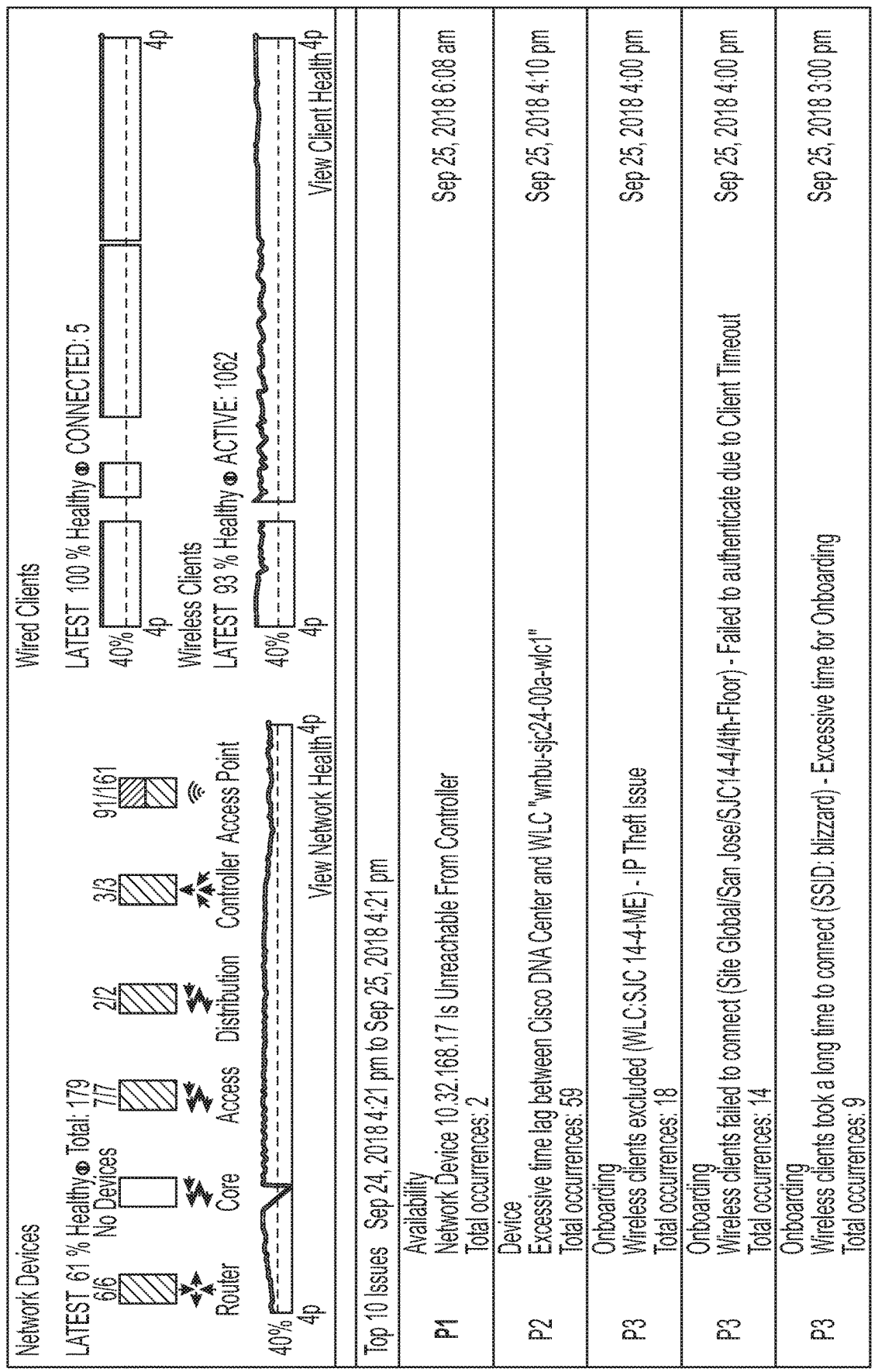
FIG. 4 shows a screen shot of how a health score may be provided.

FIG. 4 shows a screen shot of how the health score may be provided by computing device 110 to an operator of network 105. As shown in FIG. 4, embodiments of the disclosure may rank a key device in network 105 that had an issue as a P1 (i.e., a Priority 1 issue as opposed to a Priority 2 (P2) or a Priority 3 (P3) issue) due to the above described processes up weighting it in relative importance. Accordingly, the health score may be displayed by computing device 110 to the operator of network 105.

Figure 5:
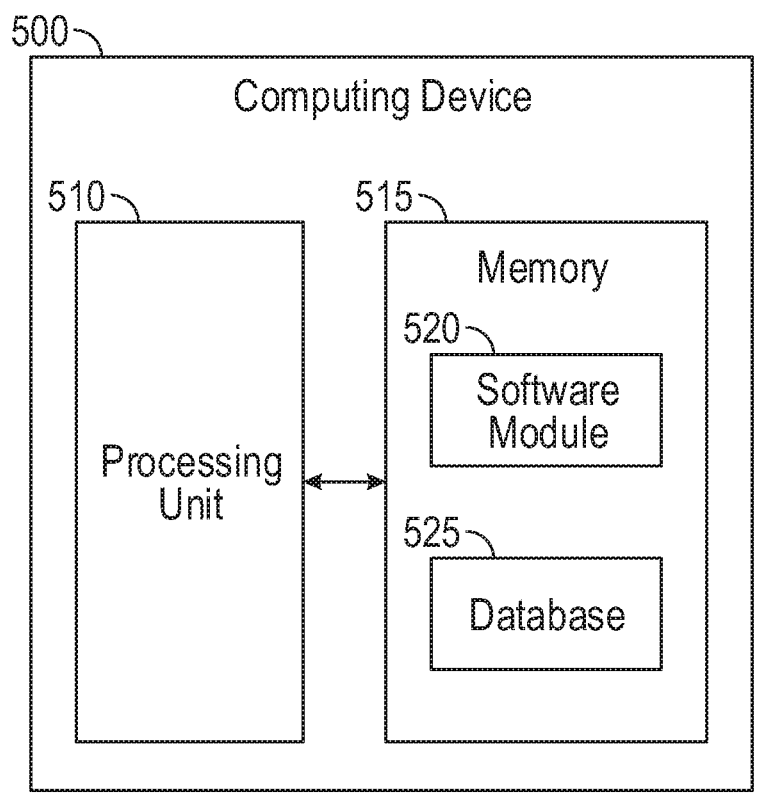
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for determining the importance of network devices based on discovered topology, managed endpoints, and activity as described above with respect to FIG. 2. Computing device 500, for example, may provide an operating environment for the plurality of network devices or computing device 110. The plurality of network devices and computing device 110 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving topology data corresponding to a network comprising a plurality of devices;
   creating a topology matrix representing the topology data, wherein rows and columns of the topology matrix corresponds to the plurality of devices, and wherein elements of the topology matrix represent connections between the plurality of devices of the rows and the columns;
   determining a stationary matrix from the topology matrix, wherein determining the stationary matrix from the topology matrix comprises:
      iteratively multiplying a randomly initialized matrix with the topology matrix a plurality of times; and
      ordering elements of the stationary matrix;
   determining, based on the ordered elements of the stationary matrix, a relative importance of each of the plurality of devices within the network; and
   determining a health score for at least one of the plurality of devices based on the relative importance of the at least one of the plurality of devices, the health score being determined using the stationary matrix.

2. The method of claim 1, wherein receiving the topology data comprises receiving the topology data in response to at least one of the following: detecting a new device being added to the network; detecting a one of the plurality of devices being removed from the network; and detecting the one of the plurality of devices being replaced on the network.

3. The method of claim 1, wherein receiving the topology data corresponding to the network comprises receiving the topology data corresponding to the network wherein the network comprises a first portion of the plurality of devices being disposed in an aggregation layer of the network and a second portion of the plurality of devices being disposed in an access layer of the network.

4. The method of claim 1, wherein creating the topology matrix comprises creating the topology matrix wherein the topology matrix is stochastic, primitive, and irreducible.

5. The method of claim 1, wherein determining the health score for the at least one of the plurality of devices comprises determining the health score based on at least one of the following: bandwidth capacity at the at least one of the plurality of devices; a manually labelled position in the network of the at least one of the plurality of devices; presence of redundant links at the at least one of the plurality of devices; absence of redundant links at the at least one of the plurality of devices; a number of known users at the at least one of the plurality of devices; a link status of the at the at least one of the plurality of devices; presence of link errors at the at least one of the plurality of devices, and congestion at a link level of the at least one of the plurality of devices.

6. The method of claim 1, further comprising providing the health score to an operator of the network.

7. A system comprising:
   a memory storage; and
   a processing unit coupled to the memory storage, wherein the processing unit is operative to:
      receive topology data corresponding to a network comprising a plurality of devices;
      create a topology matrix representing the topology data, wherein rows and columns of the topology matrix corresponds to the plurality of devices, and wherein elements of the topology matrix represent connections between the plurality of devices of the rows and the columns;
      determine a stationary matrix from the topology matrix, wherein the processing unit being operative to determine the stationary matrix from the topology matrix comprises the processing unit being operative to:
         iteratively multiply a randomly initialized matrix with the topology matrix a plurality of times; and
         order elements of the stationary matrix;
      determining, based on the ordered elements of the stationary matrix, a relative importance of each of the plurality of devices within the network; and
      determine a health score for at least one of the plurality of devices based on the relative importance of the at least one of the plurality of devices, the health score being determined using the stationary matrix.

8. The system of claim 7, wherein the processing unit being operative to receive the topology data comprises the processing unit being operative to receive the topology data in response to at least one of the following: detecting a new device being added to the network; detecting a one of the plurality of devices being removed from the network; and detecting the one of the plurality of devices being replaced on the network.

9. The system of claim 7, wherein the network comprises a first portion of the plurality of devices being disposed in an aggregation layer of the network and a second portion of the plurality of devices being disposed in an access layer of the network.

10. The system of claim 7, wherein the topology matrix is stochastic, primitive, and irreducible.

11. The system of claim 7, wherein the processing unit being operative to determine the health score for the at least one of the plurality of devices comprises the processing unit being operative to determine the health score based on at least one of the following: bandwidth capacity at the at least one of the plurality of devices; a manually labelled position in the network of the at least one of the plurality of devices; presence of redundant links at the at least one of the plurality of devices; absence of redundant links at the at least one of the plurality of devices; a number of known users at the at least one of the plurality of devices; a link status of the at the at least one of the plurality of devices; presence of link errors at the at least one of the plurality of devices, and congestion at a link level of the at least one of the plurality of devices.

12. A non-transitory computer-readable medium that stores a set of instructions which when executed perform a method executed by the set of instructions comprising:
   receiving topology data corresponding to a network comprising a plurality of devices;
   creating a topology matrix representing the topology data, wherein rows and columns of the topology matrix corresponds to the plurality of devices, and wherein elements of the topology matrix represent connections between the plurality of devices of the rows and the columns;
   determining a stationary matrix from the topology matrix, wherein determining the stationary matrix from the topology matrix comprises:

iteratively multiplying a randomly initialized matrix with the topology matrix a plurality of times; and
ordering elements of the stationary matrix;
determining, based on the ordered elements of the stationary matrix, a relative importance of each of the plurality of devices within the network; and
determining a health score for at least one of the plurality of devices based on the relative importance of the at least one of the plurality of devices, the health score being determined using the stationary matrix.

13. The non-transitory computer-readable medium of claim 12, wherein receiving the topology data comprises receiving the topology data in response to at least one of the following: detecting a new device being added to the network; detecting a one of the plurality of devices being removed from the network; and detecting the one of the plurality of devices being replaced on the network.

14. The non-transitory computer-readable medium of claim 12, wherein receiving the topology data corresponding to the network comprises receiving the topology data corresponding to the network wherein the network comprises a first portion of the plurality of devices being disposed in an aggregation layer of the network and a second portion of the plurality of devices being disposed in an access layer of the network.

15. The non-transitory computer-readable medium of claim 12, wherein creating the topology matrix comprises creating the topology matrix wherein the topology matrix is stochastic, primitive, and irreducible.

16. The non-transitory computer-readable medium of claim 12, wherein determining the health score for the at least one of the plurality of devices comprises determining the health score based on at least one of the following: bandwidth capacity at the at least one of the plurality of devices; a manually labelled position in the network of the at least one of the plurality of devices; presence of redundant links at the at least one of the plurality of devices; absence of redundant links at the at least one of the plurality of devices; a number of known users at the at least one of the plurality of devices; a link status of the at the at least one of the plurality of devices; presence of link errors at the at least one of the plurality of devices, and congestion at a link level of the at least one of the plurality of devices.

17. The non-transitory computer-readable medium of claim 12, further comprising providing the health score to an operator of the network.

* * * * *